United States Patent
Williams et al.

[11] Patent Number: 5,961,154
[45] Date of Patent: Oct. 5, 1999

[54] FUME DUCT JOINT WITH CLAMPING COLLAR

[76] Inventors: Douglas Williams, 28 Waterside Cir., San Rafael, Calif. 94903; Jeff Shea, 708 Vermont Ave., San Francisco, Calif. 94107

[21] Appl. No.: 09/154,303

[22] Filed: Sep. 16, 1998

[51] Int. Cl.[6] .................................................. F16L 13/10
[52] U.S. Cl. .............................. 285/22; 285/24; 285/328; 285/371; 285/422; 285/423; 285/915; 156/92; 156/158; 156/330
[58] Field of Search ..................................... 285/328, 371, 285/423, 915, 422, 22, 24, 256; 156/92, 330, 158

[56] References Cited

U.S. PATENT DOCUMENTS

| | | | |
|---|---|---|---|
| 2,273,398 | 2/1942 | Couty et al. | 285/256 X |
| 3,982,779 | 9/1976 | Hickey | 285/328 |
| 4,150,848 | 4/1979 | Dyrup | 285/328 X |
| 5,234,234 | 8/1993 | Hearn | 285/328 |
| 5,298,299 | 3/1994 | shea | 428/34.5 |
| 5,505,497 | 4/1996 | Shea et al. | 285/55 |
| 5,549,949 | 8/1998 | Williams et al. | 428/36.9 |

FOREIGN PATENT DOCUMENTS

| | | | |
|---|---|---|---|
| 5118486 | 5/1993 | Japan | 285/22 |
| 3742335 | 6/1989 | United Kingdom | 285/328 |

*Primary Examiner*—Dave W. Arola
*Attorney, Agent, or Firm*—Donald Diamond

[57] ABSTRACT

A fume exhaust duct joint, a clamping collar for clamping two cylindrical dual-laminate duct sections joined by an internal slip collar, and a method for assembling the joint. A first embodiment of the clamping collar has two clamp portions each including a metal outer skin spot-welded to a metal inner skin. The inner skins have bifurcated protrusions whose bifurcations penetrate the duct section outer surfaces when the collar is tightened, and, optionally, two circumferential beads of fire retardant caulking. The inner skins and slip collar are bonded to duct section surfaces using a putty-like sealant including a settable admixture of curing agent and novolac epoxy resin. A second embodiment of the clamping collar, preferred for duct sections 3-inches in diameter or smaller, has a single circumferential clamp portion.

16 Claims, 6 Drawing Sheets

FUME DUCT JOINT WITH CLAMPING COLLAR

BACKGROUND OF THE INVENTION

1. Field of the Invention

The present invention relates to fume exhaust duct connections for fiberglass reinforced plastic duct sections, and more particularly to a joint including a collar that provides an improved method for joining duct sections after applying a sealant to form a circumferential joint bond between pairs of adjoining duct section ends.

2. Description of the Related Art

Ductwork for corrosive vapor exhaust systems is used extensively in many diverse industries which utilize hazardous chemicals to process raw materials or perform manufacturing procedures, such as the semiconductor, plating, and pharmaceutical industries. Such ductwork also is required in the many research and development laboratories which use highly reactive, toxic or otherwise hazardous chemicals. Such chemicals not only can put workers at risk to hazardous fumes, but also are potential sources of contamination of industrial processes or laboratory experiments. Consequently, vapors from hazardous chemicals must be exhausted through leak-proof air ducts to safely remove them from work areas. Duct installations can be very large, consisting of many thousands of feet of ductwork which may be manifolded and connected to multiple exhaust fans. Because of the wide diversity of chemicals used in industrial and research applications, it is extremely difficult to provide a single material for fabricating ductwork which can withstand all the chemicals to which duct interiors may be exposed. Over the past forty years the trend in materials has been away from bare and coated metals and toward the use of plastics, particularly fiberglass reinforced plastics (FRP's) which incorporate various types of resins.

In addition to the problem of providing a duct capable of resisting broad classes of chemical vapors, there is also the problem of providing adequate resistance to fire. Unlike metallic ducts, plastic ducts exhausting chemicals which can react exothermically or with the duct interior surface are at risk to being set on fire. A problem common to all plastics has been flammability. Plastics can burn rapidly and produce toxic smoke, creating hazards of their own.

U.S. Pat. No. 5,298,299 to L. E. Shea, entitled "Double Wall Fireproof Duct", which is incorporated in its entirety herein by reference, is directed to a dual-laminate tubular duct section having both good chemical resistance and good fire resistance. An inner laminate is formed by coating a mylar wrapped mandrel with a chemically resistant resin and then wrapping the mandrel with successive layers of FRP fabric saturated with the resin. An outer laminate is then formed directly over the inner laminate by applying successive layers of FRP fabric saturated with a fire-retardant resin.

U.S. Pat. No. 5,549,949 ("'949") to D. Williams et al., entitled "Fume Duct Circumferential Joint Sealant", which is incorporated in its entirety herein by reference, is directed to sealant compositions for sealing the circumferential joint between pairs of dual-laminate fume duct sections, and to a joint sealing method which provides strong bonding between the sealant and laminate surfaces which typically are phenolic/glass and vinyl ester. As discussed therein, ducts are fabricated as sections of standard length(s) which are transported to a job site and assembled there. Since a leak-proof joint is required between each pair of contiguous sections, even the smallest installation requires a considerable number of such joints. Joints must not only prevent fumes from escaping in day-to-day operation, but must also remain leak-proof after prolonged exposure to corrosive or otherwise reactive chemicals. Also, joints must not fail catastrophically in the event a flame propagates through the interior or, if exposed directly to heat such as from a fire external to the ductwork, fail mechanically or become a source of smoke particulates and other contaminants. Because mechanical interfacing cannot by itself prevent leakage, a sealant must be applied circumferentially to each interface. The '949 patent provides a solution to simplifying what had been the most time-consuming step in joining dual-laminate sections, viz., preparing the resin-impregnated surfaces to which the sealant must bond in order to effect a leak-proof seal. Unless mating surfaces near the ends of each duct section were first sanded or otherwise polished, the interposing sealant layer would not uniformly adhere to the surfaces, resulting in porosities in the hardened sealant through which fumes could leak. These surfaces include the opposed end portions of the inner laminate surface, the opposed end portions of the outer laminate surface, and the exterior surfaces of a "slip" collar interposed internally between each pair of end sections.

By enabling the time and labor needed to assemble multi-section ductwork to be reduced, use of the sealant disclosed in the '949 patent can be an important factor in improving the profitability of businesses which install fume ducts. Many installations, however, require joints to have greater integrity to rupture from tensile and flexural loading than can be provided using only mechanical interfacing between the duct sections and slip collar, and sealant bonding. For example, ductwork disposed exterior to a building must be able to withstand flexure due to wind shear. Also, high velocity gases resulting from an explosive chemical reaction within a localized portion of a duct can create a large overpressure, stressing nearby joints even if the duct sections remain intact. The method disclosed in the '949 patent for reinforcing a joint is to form a "lay-up" bond by tightly winding alternate layers of fine boat cloth mesh and a combination of fiberglass sheeting and coarse woven roving mesh around the joint seam. The larger the duct diameter, the more layers must be used. Each time a dry layer is wound, it must be "wet out" with a resin component of the sealant. Lay-up reinforcement substantially strengthens the joint to the extent that under tensile loading the duct material is likely to rupture before the joint fails. While not as significant a cost driver as sanding, the lay-up method also entails considerable time and labor. Consequently, there is a need for a faster, easier and thereby more cost-effective method for maintaining duct section joint integrity against internal and external tensile and flexural loading. To streamline ductwork assembly, attachment of a device implementing the method should be simple and reliable.

A device for connecting together two FRP duct sections, each having a terminal end portion of equal diameter, is disclosed in U.S. Pat. No. 5,505,497 ("'497") to L.E. Shea et al., entitled "Mechanical Joint Connections for Fiberglass Reinforced Duct Sections". The device includes two end gaskets each covering and sealed to an end portion, a central gasket covering the two end gaskets and extending around both end portions, two spacer gaskets supporting a flexible metal sleeve surrounding the central gasket, and tightening devices on the sleeve which compress the central gasket and hold the aligned duct sections together. The tightening devices are spring-driven so that if the elastomeric gaskets are reduced due to fire, the sleeve will maintain a firm non-slip hold on the duct joint. The '497 device is not adapted for use with joints that incorporate an internal slip collar, and makes minimal use of sealant because FRP surfaces mate with gaskets rather than with other FRP surfaces. The sleeve acts to compress the gaskets and keep the duct sections aligned, but does not enhance structural integrity against tensile and flexural loads.

Joints assembled according to the lay-up method are potentially susceptible to failure due to heating from flames interior or exterior to the ductwork. Even if a joint interior is not heated to a temperature high enough to cause the duct material to melt or burn through, the sealant can melt, burn or otherwise decompose to an extent that gases leak out. Similarly, if the joint exterior is heated, the sealant coating exterior mating surfaces can melt. At sufficiently high temperature, the lay-up wrapping can begin to burn, greatly reducing structural integrity and making the joint vulnerable to rupture from a normal flexural load.

Fire retardant materials that have the ability to remain in an unexpanded elastomeric form until heat from a fire causes "intumescent" expansion to fill burned-out voids with a fire-resistant barrier are widely used in gaskets and as caulking. For example, the central gasket of the '497 device may contain an intumescent material which causes it to swell up and increase in volume in response to elevated temperatures caused by fire within the duct sections. Alternatively, the central gasket may include a flexible bag enclosing a flowable quantity of intumescent material held tightly by the sleeve. The bag would swell and increase in volume if the-duct sections are partially consumed by fire, thereby serving to maintain the structural integrity of the joint.

OBJECTS OF THE INVENTION

In view of the foregoing, it is a primary object of the present invention to provide an improved method and a device for joining FRP fume duct tubular sections.

Another object of the invention is to provide a method and device for maintaining the structural integrity of FRP fume duct joints, which include an internal slip collar, against tensile and flexural loading without the need for lay-up reinforcement.

A further object of the invention is to provide a device which can be easily and quickly affixed to a joint between two fume duct tubular sections.

Yet another object of the invention is to provide a device which can be manufactured over a range of sizes to accommodate tubular fume duct sections ranging in diameter from a few inches to several feet.

Other objects of the invention will become evident when the following description is considered with the accompanying drawings.

SUMMARY OF THE INVENTION

These and other objects are met by the present invention which in one aspect provides a fume exhaust duct joint including: a cylindrical FRP slip collar having an outer surface with a central circumferential rib; two cylindrical FRP duct sections, each terminating in an end portion superimposed on the collar and in abutment with the rib; adhesive sealant interposed between the end portions and the slip collar outer surface; means for circumferentially clamping the two end portions; means for mechanically linking the clamping means to the end portions so as to impede slippage between the clamping means and end portions under tensile loading; and adhesive sealant interposed between the clamping means and end portions. Optionally, the duct joint further includes fire retardant material interposed between the clamping means and end portions. The sealant includes a settable admixture of curing agent and novolac epoxy resin. The clamping means includes at least one arcuate clamp portion having a metal inner skin attached to a metal outer skin. The mechanical linkage means is a multiplicity of punched protrusions in each inner skin, with each protrusion having an apex in penetrating contact with one of the duct section end portions. The fire retardant material is an opposed pair of circumferential intumescent caulk beads attached to each inner skin.

In another aspect the invention provides a clamping collar for clamping two cylindrical FRP duct section end portions superimposed on a cylindrical FRP slip collar having a centrally disposed, circumferential rib. The clamping collar includes: circumferential clamping means about the end portions; and mechanical linkage means between the clamping means and end portions so as to impede slippage between the clamping means and end portions under tensile loading. Optionally, the clamping collar further includes fire retardant material between the clamping means and end portions. The clamping means includes at least one arcuate clamp portion having a metal inner skin attached to a metal outer skin. The mechanical linkage means is a multiplicity of punched protrusions in each inner skin, with each protrusion having a bifurcated apex whose bifurcations are in penetrating contact with one of the duct section end portions. The fire retardant material is an opposed pair of circumferential intumescent caulk beads attached to each inner skin.

In still another aspect the invention provides a clamping collar for clamping two cylindrical FRP duct section end portions superimposed on a cylindrical FRP slip collar having a central circumferential rib. The clamping collar includes first and second clamp portions, with each clamp portion having a cylindrically arcuate metal outer skin bounded by opposed ends, with each end extending radially in a flange having a plurality of bolt-holes as, for example, three bolt-holes, and further having a cylindrically arcuate metal inner skin such that the outer and inner skins can be congruently juxtaposed. Each inner skin is rotationally offset from and spot-welded to the juxtaposed outer skin so that an end portion of the inner skin extends beyond a radial flange to form a seal guide which slides under the opposed flange of the other clamp portion when the clamp portions are clamped around the two duct section end portions. Each inner skin has an inner surface having a multiplicity of punched protrusions, with each protrusion having a bifurcated apex whose bifurcations are brought into penetrating contact with one of the duct section end portions as the two clamp portions are tightened about the end portions. The clamping collar further includes a plurality of bolts and nuts, with each bolt passing through a pair of corresponding holes in each pair of opposed flanges and secured by an adjustably tightenable nut. Optionally, the clamping collar further includes an opposed pair of circumferential intumescent caulk beads attached to the inner surface of each inner skin.

In another aspect the invention provides a clamping collar for clamping two cylindrical FRP duct section end portions superimposed on a cylindrical FRP slip collar having a central circumferential rib. The clamping collar includes a clamp portion having a cylindrically arcuate metal outer skin bounded by opposed ends, with each end extending radially in a flange having a plurality of bolt-holes as, for example, three bolt-holes, and further having a cylindrically arcuate metal inner skin such that the outer and inner skins can be congruently juxtaposed. The inner skin is rotationally offset from and spot-welded to the juxtaposed outer skin so that an end portion of the inner skin extends beyond a radial flange to form a seal guide which slides under the opposed flange when the clamp portion is clamped around the two duct section end portions. The inner skin has an inner surface having a multiplicity of punched protrusions, with each protrusion having a bifurcated apex whose bifurcations are brought into penetrating contact with one of the duct section end portions as the clamp portion is tightened about the end portions. The clamping collar further includes a plurality of bolts and nuts, with each bolt passing through a pair of corresponding holes in the opposed flanges and secured by an adjustably tightenable nut. Optionally, the clamping collar further includes an opposed pair of circumferential intumescent caulk beads attached to the inner surface of the inner skin.

In yet another aspect the invention provides a method for assembling a fume exhaust duct joint including a cylindrical FRP slip collar having an outer surface with a central circumferential rib, and first (upstream) and second (downstream) cylindrical FRP duct sections. Each duct section terminates in an end portion to be superimposed on the slip collar. The method includes the steps of: coating the entire inner surface of each end portion with a relatively thin layer of adhesive sealant; coating the entire outer surface of the slip collar with a relatively thick layer of the sealant; inserting the slip collar into the end portion of the upstream duct section until the end portion abuts the circumferential rib; beveling smooth any sealant extruded into the interior of the slip collar; inserting the slip collar into the end portion of the downstream duct section until the end portion abuts the circumferential rib; spreading sealant extruded onto the end portion outer surfaces laterally and circumferentially around the surfaces; surrounding the end portions with a bifurcated clamping collar including first and second clamp portions; and tightening the clamp portions about the end portions. Each clamp portion has a cylindrically arcuate metal outer skin bounded by opposed ends with each end extending radially in a flange having a plurality of collinear holes, and a cylindrically arcuate metal inner skin such that each pair of outer and inner skins can be congruently juxtaposed, with each inner skin rotationally offset from and attached to the juxtaposed outer skin so that an end portion of the inner skin extends beyond a radial flange to form a seal guide which slides under the opposed flange of the other clamp portion when the clamp portions are disposed circumferentially about the duct section end portions. Each inner skin has an inner surface having a multiplicity of punched protrusions, with each protrusion having a bifurcated apex whose bifurcations are brought into penetrating contact with one of the duct section end portions as the clamp portions are tightened about the end portions using a plurality of bolts and nuts, with each bolt passing through a pair of corresponding holes in each pair of opposed flanges and secured by an adjustably tightenable nut. Optionally, a pair of opposed, circumferential intumescent caulk beads are attached to the inner surface of each inner skin. The adhesive sealant includes a settable admixture of curing agent and novolac epoxy resin.

These and other features and advantages of the invention will become further apparent from the detailed description that follows, which is accompanied by drawing figures. In the figures and description, numerals indicate the various features of the invention, like numerals referring to like features throughout both the drawings and description.

BRIEF DESCRIPTION OF THE DRAWINGS

FIG. 7B is a detail view of region "7B" in FIG. 7 showing a punched protrusion and an intumescent caulk bead.

DESCRIPTION OF THE PREFERRED EMBODIMENTS

I. Introduction

Figures 1, 1A:
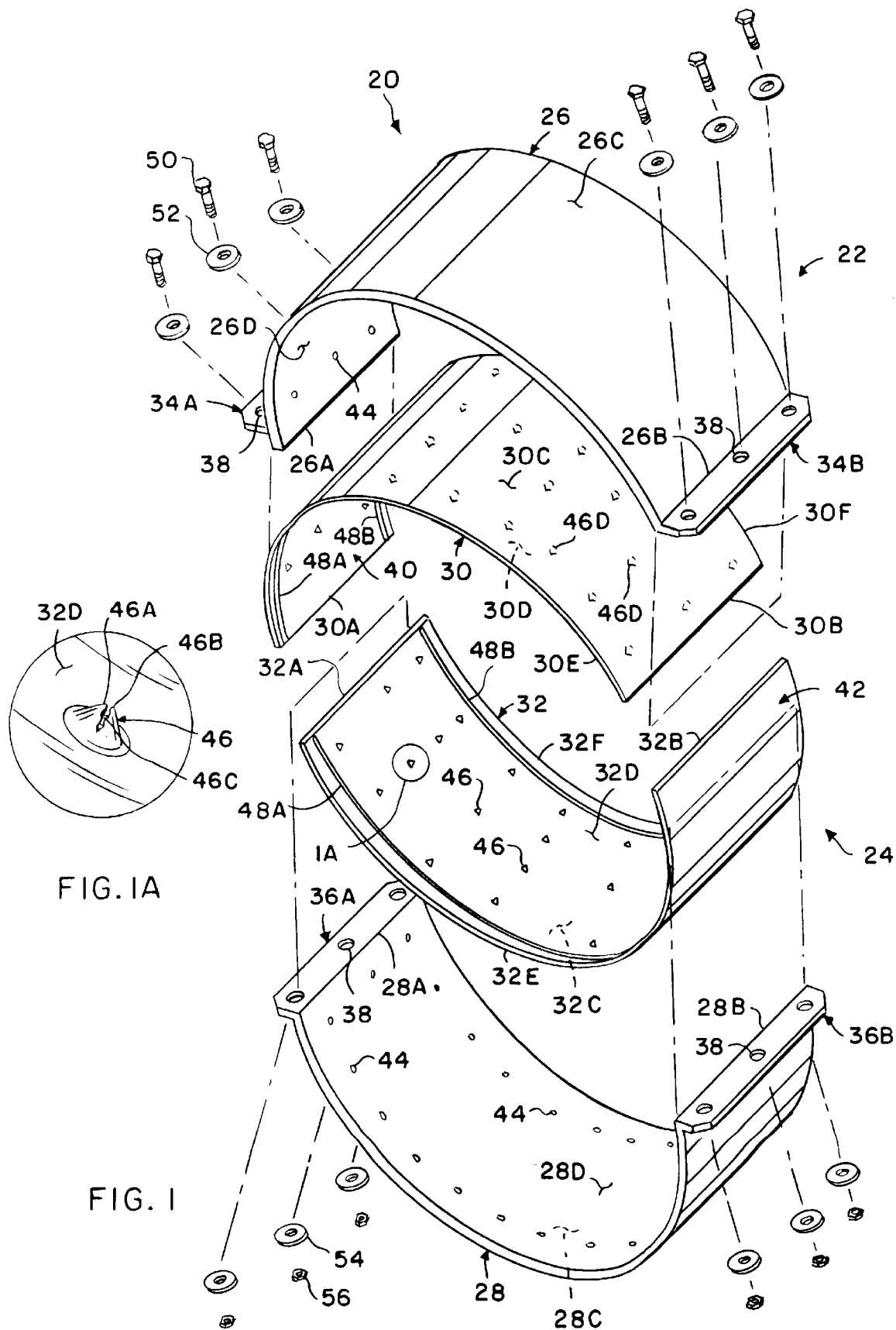
FIG. 1 is an exploded perspective view of a first embodiment of a clamping collar according to the invention, including first and second flanged outer skins, and first and second inner skins spot-welded, respectively, to the outer skins, each having a multiplicity of inwardly directed, bifurcated protrusions.
FIG. 1A is a detail view of region "1A" in FIG. 1 showing a protrusion.

While the present invention is open to various modifications and alternative constructions, the preferred embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

Where used herein, the word "attached" means that the two parts referred to (e.g., the outer and inner skins of the clamping collar, or a duct section end portion and an internal slip collar end portion) are either spot-welded together, or are bonded together by sealant. Where used herein, the word "connected" means that the two parts referred to (e.g., a bolt and nut tightening the collar flanges) can be separated after being joined in a reversible combination.

II. Clamping Collar First Embodiment and Duct Joint

Referring to FIG. 1, in a first embodiment of the invention a clamping collar 20 includes opposed first and second clamp portions 22, 24 each having a generally cylindrical metal outer skin 26, 28, respectively, hounded by, respectively, opposed ends 26A, 26B and 28A, 28B, and a generally cylindrical metal inner skin 30, 32, respectively, bounded by, respectively, opposed ends 30A, 30B and 32A, 32B. Outer skins 26, 28 each have an outer surface 26C, 28C, respectively, and an inner surface 26D, 28D, respectively. Inner skins 30, 32 each have an outer surface 30C, 32C, respectively, and an inner surface 30D, 32D, respectively. Outer skin ends 26A, 26B, 28A, 28B extend radially in a flange 34A, 34B, 36A, 36B, respectively. Each flange has three collinear bolt-holes 38. Outer skins 26, 28 and inner skins 30, 32 have radii of curvature such that each pair of outer and inner skins (26, 30), (28, 32) maintain congruent juxtaposition in any rotationally relative orientation. Inner skin 30 is rotationally offset from and rigidly attached to outer skin 26 so that an end portion 40 of skin 30 extends beyond flange 34A to form a "seal guide" which slides under opposed flange 36A of outer skin 28 when clamp portions 22, 24 are brought into contact. Similarly, inner skin 32 is rotationally offset from and rigidly attached to outer skin 28 so that an end portion 42 of skin 32 extends beyond flange 36B to form a seal guide which slides under opposed flange 34B of outer skin 26. The seal guides serve to complete a circumferential seal around the duct joint which would act to prevent toxic gases from escaping into the work environment should a fire occur which ruptures the joint. Preferably, the outer skins are fabricated from stainless steel plate having a minimum thickness of about 0.050-inch and a maximum thickness of about 0.141-inch. Preferably, the inner skins are fabricated from stainless steel plate having a minimum thickness of about 0.012-inch and a maximum thickness of about 0.037-inch. Preferably, the outer and inner skins are attached by means of a multiplicity of spot-welds 44, although other forms of attachment may be used, consistent with simplicity of manufacture and reliability.

Inner surfaces 30D, 32D each have a multiplicity of inwardly directed protrusions 46 resulting from impacting outer surfaces 30C, 32C with a mechanical punching device, thereby creating a depression 46D in the outer surfaces at each point of impact. As depicted in FIG. 1A, the apex of each punched protrusion has bifurcations 46A, 46B separated by a slit 46C. Optionally, inner surfaces 30D, 32D each include two opposed beads 48A, 48B of intumescent caulking attached circumferentially around the inner surfaces at approximately 1-inch from each inner surface edge (30E, 30F), (32E, 32F), respectively. Clamp portions 22 and 24 are connected by a bolt 50 passing through each hole 38 in the flanges 34A, 36A and 34B, 36B. Each bolt is secured by first and second washers 52, 54, and a nut 56 which can be tightened with an ordinary crescent or open-end wrench. Outer skins 26, 28 and inner skins 30, 32 have a common width which is sized according to the nominal inner diameter of collar 20, which is the common outer diameter of the cylindrical duct sections being connected. For an inner diameter of 3-inches or less, the preferred width is 3-inches; between 4- and 12-inches, the width is 5-inches; between 14- and 20-inches, the width is 6-inches; between 22- and 30-inches, the width is 8-inches; between 32- and 42-inches, the width is 10-inches; between 44- and 54-inches, the width is 12-inches. For an inner diameter greater than 54-inches, the preferred width is 16-inches.

Figure 2:
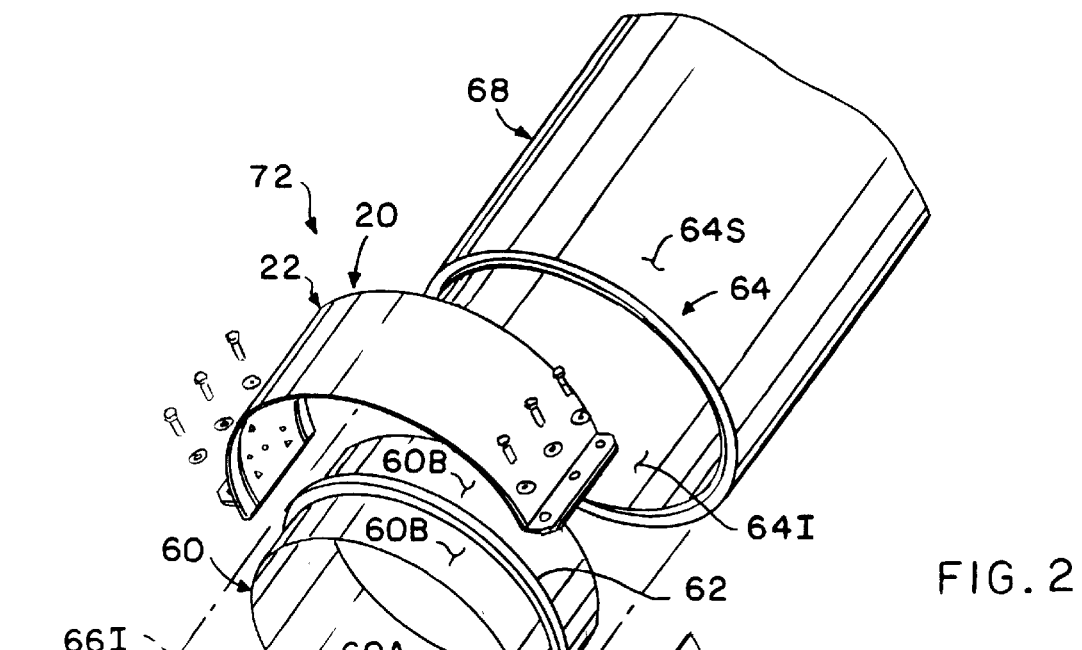
FIG. 2 is an exploded perspective view of the FIG. 1 collar clamped onto a fume duct joint formed by two opposed dual-laminate duct section ends mated with an internal slip collar.

Referring to FIG. 2, a generally cylindrical FRP slip collar 60, having an inner surface 60A and an outer surface 60B from which extends a centrally disposed circumferential rib 62, is closely received within end portions 64, 66 of first (upstream) and second (downstream) generally cylindrical FRP dual-laminate duct sections 68, 70, respectively. End portions 64, 66 have, respectively, an outer surface 64S, 66S which is the outer surface of the outer laminate, and an inner surface 64I, 66I which is the inner surface of the inner laminate. Clamp portions 22 and 24 of collar 20 circumferentially surround the slip collar 60 and end portions 64, 66 to form a fume exhaust duct joint 72. As depicted in FIG. 7B, when clamp portions 22, 24 are tightened, the bifurcations 46A, 46B of each protrusion 46 penetrate surfaces 64S, 66S, thus providing a means to impede slippage between the clamping collar 20 and end portions 64, 66 should the duct sections 68, 70 come under tension.

Figure 3:
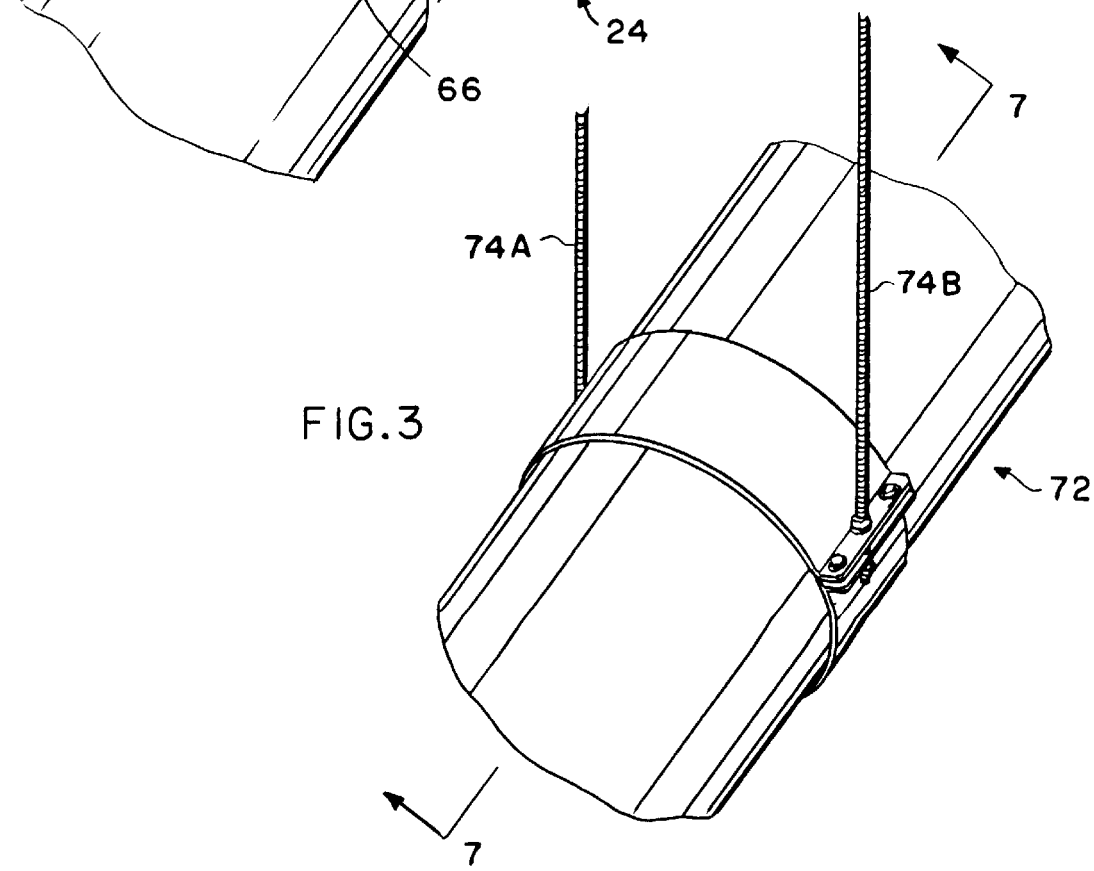
FIG. 3 is a perspective view of the assembled FIG. 2 joint and clamping collar, with two threaded rods attached to the collar flanges acting as both middle bolt-hole fasteners and as a duct hanger support.

FIG. 3 shows the joint 72 with a pair of threaded rods 74A, 74B which connect the middle holes of the opposed flanges. The rods also serve as two portions of a duct support so that with a connecting cross-piece the duct sections may be hung from an external framework.

III. Method for Assembling Duct Joint

Figure 4:
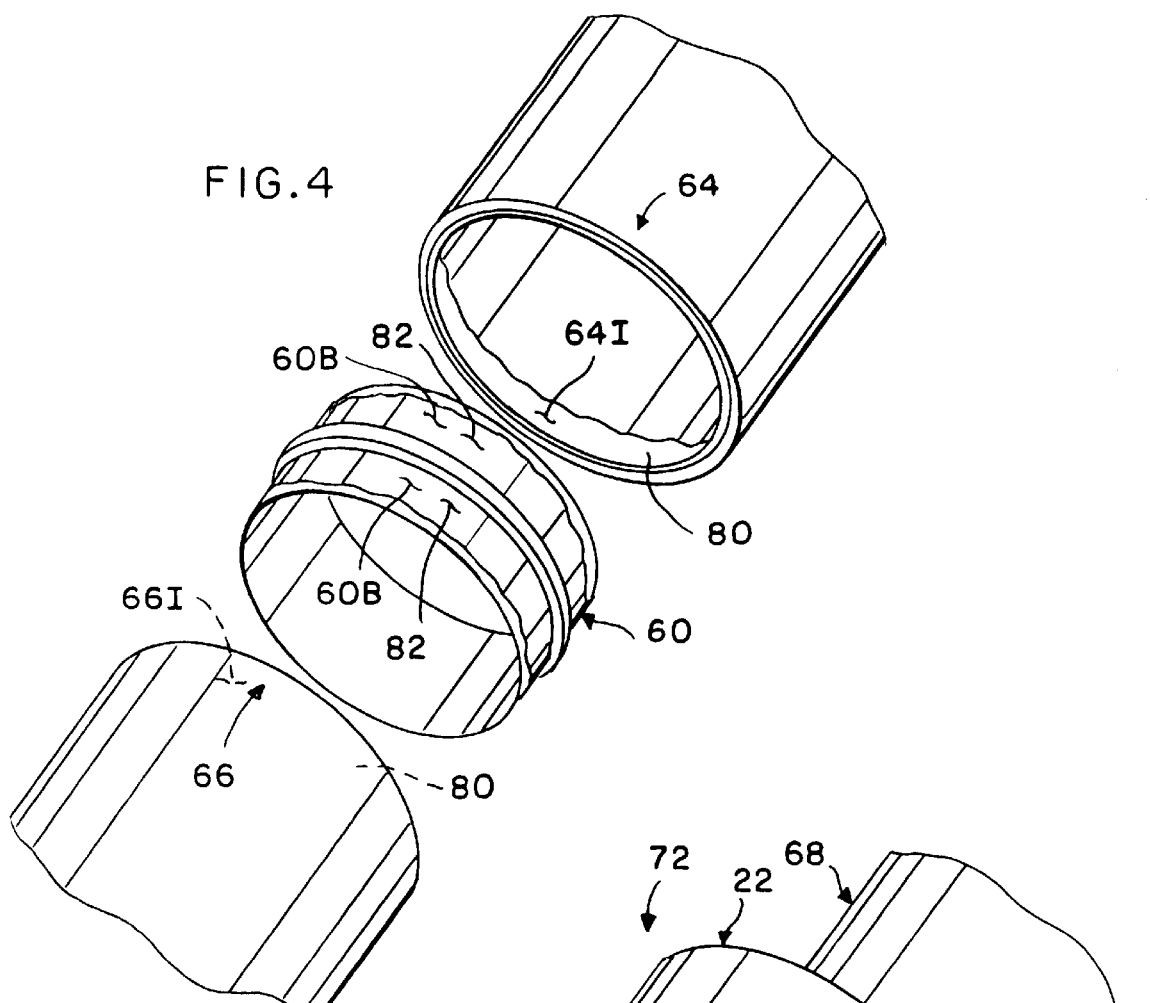
FIG. 4 is a perspective view showing the first step in assembling the FIG. 2 joint.

FIG. 4 shows the first step in assembling the duct joint 72. A relatively thin layer 80 of a sealant which includes a settable admixture of curing agent and novolac epoxy resin having a putty-like consistency is applied around the perimeter of inner surfaces 64I, 66I of duct section end portions 64, 66, respectively. The sealant is also applied as a relatively thick layer 82 on the entire outer surface 60B of slip collar 60.

Figure 5:
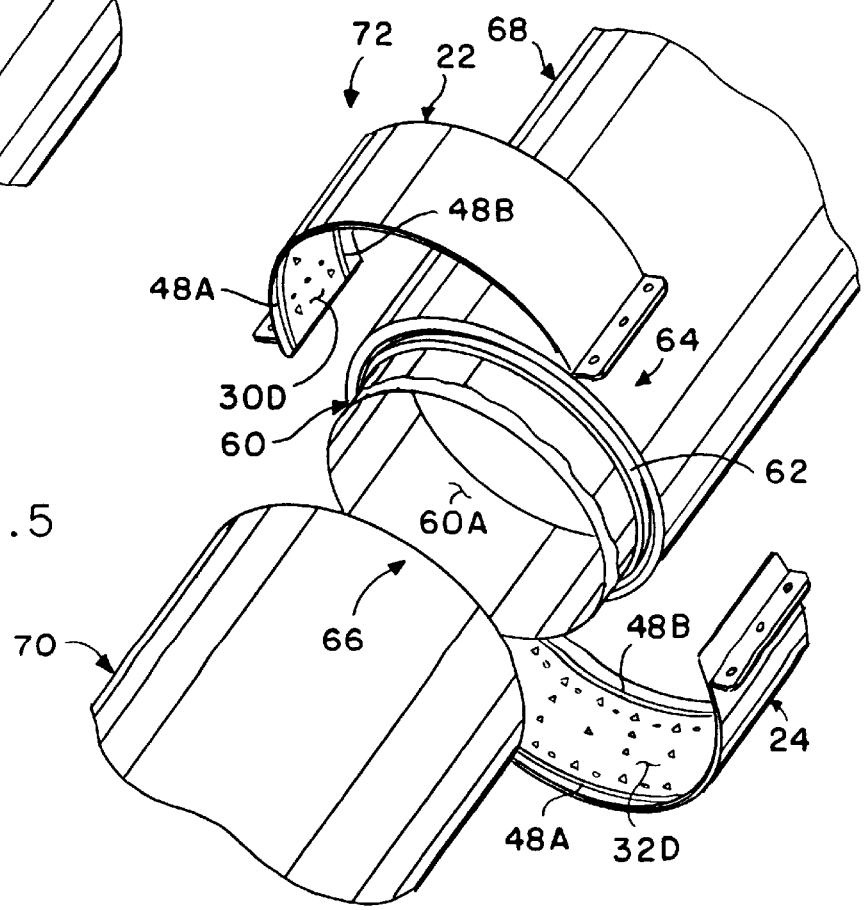
FIG. 5 is a perspective view showing the second step in assembling the FIG. 2 joint and attaching the FIGS. 1, 2 clamping collar.

FIG. 5 shows the second step in assembling the duct joint 72. Slip collar 60 is inserted into end portion 64 of upstream duct section 68 until the circumferential rib 62 contacts the end portion. This causes a small quantity of sealant to be extruded out on the upstream side of rib 62. A small quantity of sealant extruded onto inner surface 60A may be beveled smooth by applying fingertip pressure. Slip collar 60, now attached to duct section 68, is then inserted into end portion 66 of downstream duct section 70 until rib 62 contacts the end portion. A small quantity of sealant is extruded out on the downstream side of rib 62. Optionally, opposed circumferential intumescent caulking beads 48A, 48B are attached to inner surfaces 30D, 32D before clamp portions 22, 24 are moved into position around the now mated end portions 64 and 66.

Figure 6:
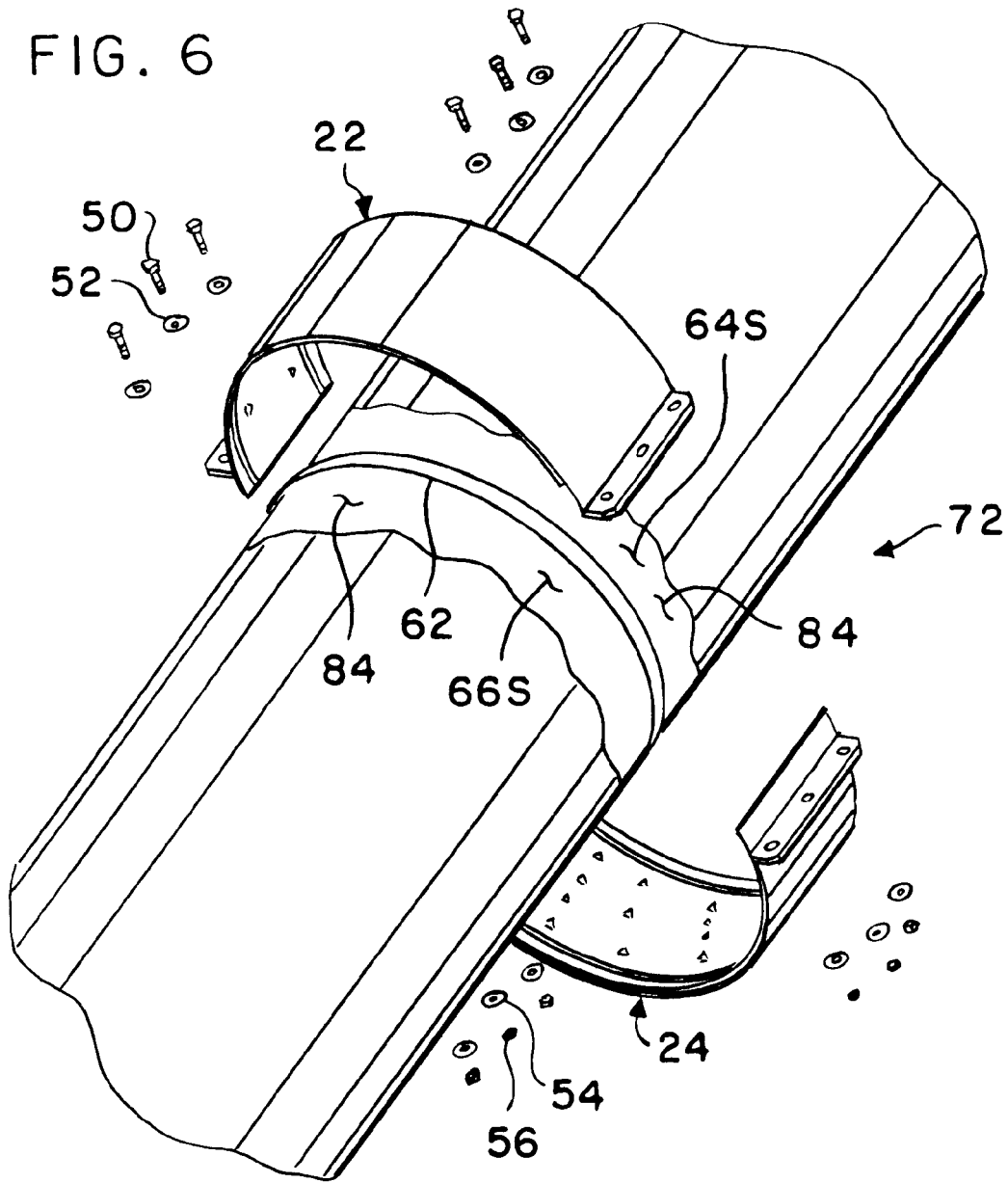
FIG. 6 is a perspective view showing the third step in assembling the FIG. 2 joint and attaching the FIGS. 1, 2 clamping collar.

FIG. 6 shows the third step in assembling the duct joint 72. Sealant extruded on both sides of rib 62 is spread around outer surfaces 64S, 66S to form a circumferential layer 84, about ⅛-inch in thickness, covering an area at least 3-inches in width on either side of rib 62. Clamp portions 22, 24 are then centered with respect to rib 62, and the bolts 50, washers 52, 54, and nuts 56 connected to the flanges and tightened.

Figure 7:
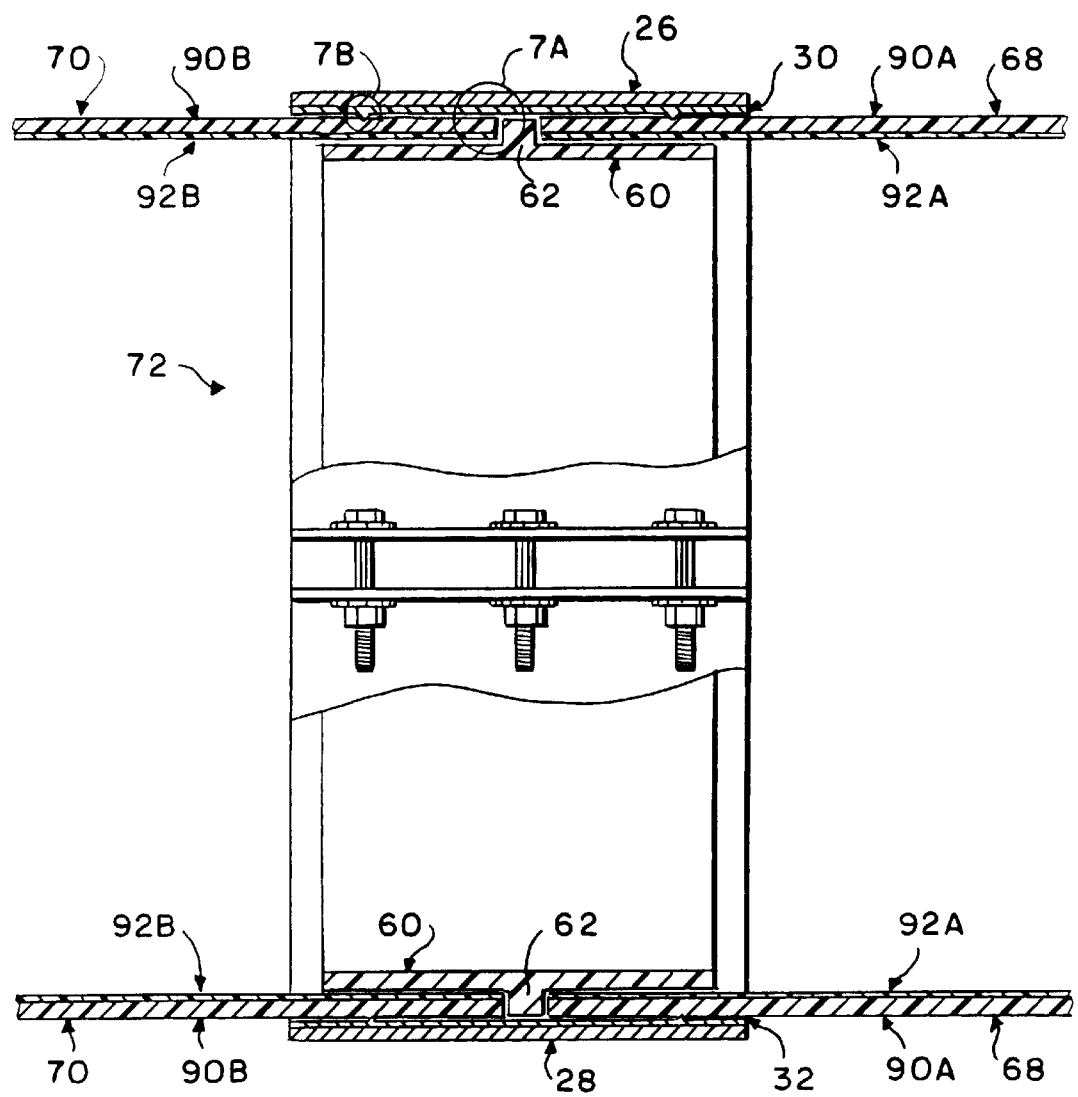
FIG. 7 is a cross-sectional view taken along lines 7—7 of FIG. 3.
Figure 7A:
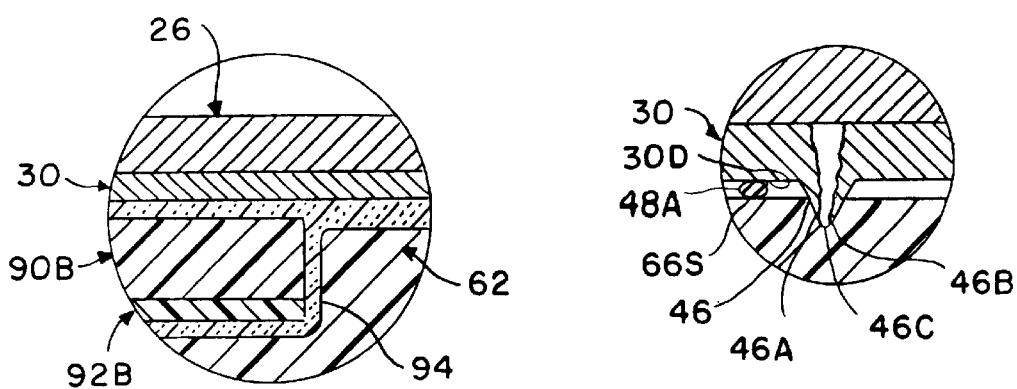
FIG. 7A is a detail view of region "7A" in FIG. 7 showing the FIG. 1 clamping collar outer and inner skins, the FIGS. 2, 3 slip collar, and the FIG. 7 duct laminates.

FIG. 7 shows the duct joint 72 in cross-section. The joint includes clamp portion metal outer skins 26, 28; clamp portion metal inner skins 30, 32; phenolic exterior laminates 90A, 90B of duct sections 68, 70, respectively; vinyl ester interior laminates 92A, 92B of duct sections 68, 70, respectively; and the slip collar 60 including rib 62. FIG. 7A shows how rib 62, inner skin 30, exterior laminate 90B, and interior laminate 92B are bonded together by a continuous sealant layer 94. Thus, only the outer skin 26 does not directly contact the sealant. FIG. 7B shows how, when the nut-and-bolt assemblies are tightened, the bifurcations 46A, 46B of protrusions 46 on inner skin 30 penetrate into the outer laminates (here, laminate 90B), and how the (optional) intumescent caulking beads (here, bead 48A) are compressed between surfaces 30D and 66S.

For large diameter duct sections, viz., those having a diameter of at least 4-feet so that their interiors are easily accessible, an alternative method for assembling a duct joint is to liberally apply sealant to inner surfaces 30D, 32D before bolting clamping collar 20 over the joint seam. The joint may or may not include the internal slip collar 60. Once the bolts 50 are tightened, the interior joint seam is sealed with sealant and reinforced by forming a lay-up bond within the interior analogous to the technique disclosed in the '949 patent.

IV. Clamping Collar Second Embodiment

Figure 8:
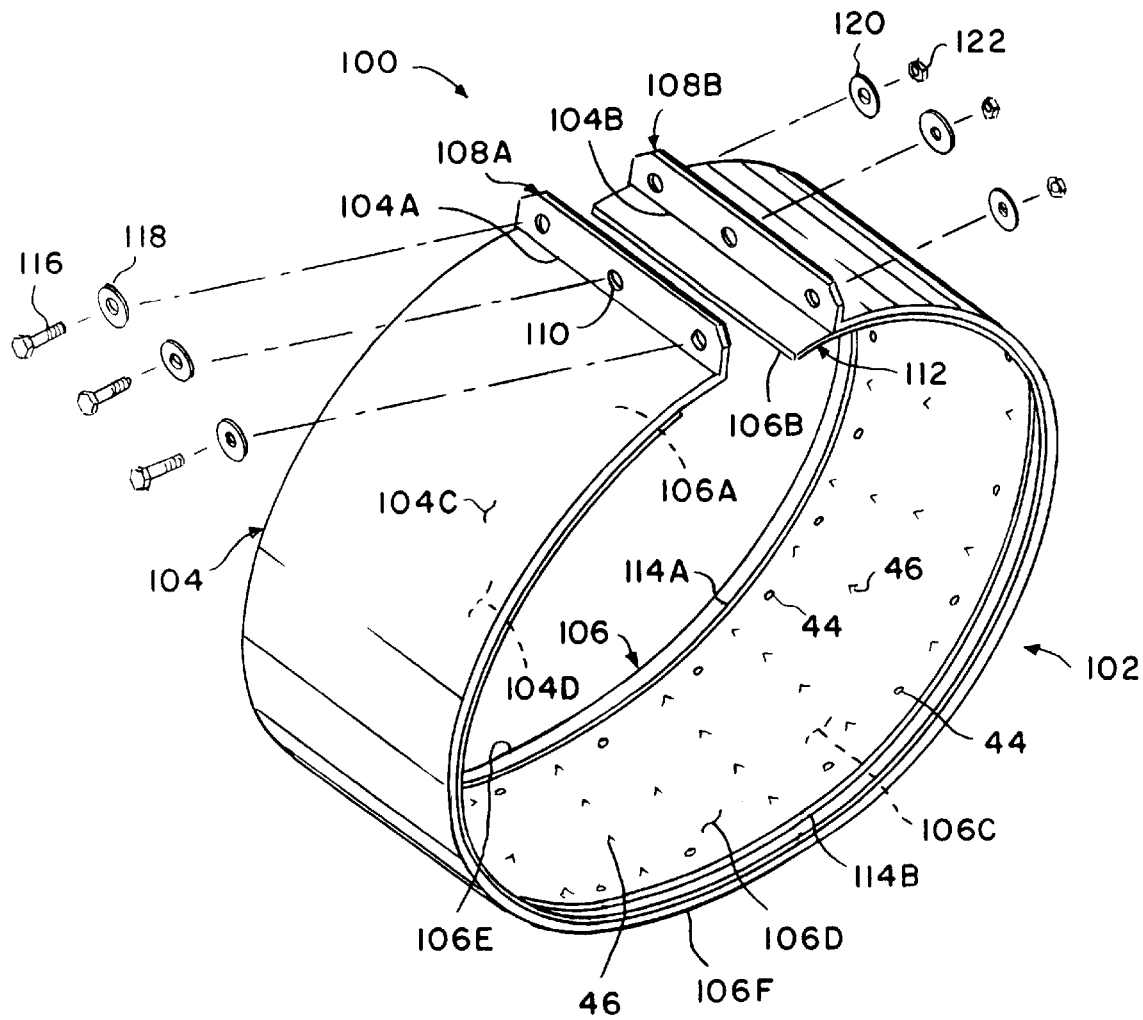
FIG. 8 is a perspective view of a second embodiment of a clamping collar, including a flanged outer skin, and an inner skin, spot-welded to the outer skin, having a multiplicity of inwardly directed, bifurcated protrusions.

Referring to FIG. 8, in a second embodiment of the invention a clamping collar 100 includes a clamp portion 102 having a generally cylindrical metal outer skin 104 bounded by opposed ends 104A, 104B, and a generally cylindrical metal inner skin 106 bounded by opposed ends 106A, 106B. Both skins are substantially circumferential, i.e., their curvatures extend over a large portion of a 360° circle. Outer skin 104 has an outer surface 104C and an inner surface 104D. Inner skin 106 has an outer surface 106C and an inner surface 106D. Outer skin ends 104A, 104B extend radially in a flange 108A, 108B, respectively. Each flange has three collinear bolt holes 110. Outer skin 104 and inner skin 106 have radii of curvature such that the skins maintain congruent juxtaposition in any rotationally relative orientation. Inner skin 106 is rotationally offset from and rigidly attached to outer skin 104 so that an end portion 112 of skin 106 extends beyond flange 108B to form a seal guide which slides under opposed flange 108A. As in the first embodiment, preferably the outer skin is fabricated from stainless steel plate having a minimum thickness of about 0.050-inch and a maximum thickness of about 0.141-inch, and the inner skin is fabricated from stainless steel plate having a minimum thickness of about 0.012-inch and a maximum thickness of about 0.037-inch. Preferably, the outer and inner skins are attached by means of a multiplicity of spot-welds 44, although other forms of attachment may be used, consistent with simplicity of manufacture and reliability.

As in the first embodiment, inner surface 106D has a multiplicity of inwardly directed protrusions 46 having bifurcations 46A, 46B (see FIG. 1A). Optionally, inner surface 106D includes two opposed beads 114A, 114B of intumescent cauling attached circumferentially around the inner surface at approximately 1-inch from each inner surface edge 106E, 106F. Flanges 108A, 108B are connected by a bolt 116 passing through each hole 110. Each bolt is secured by first and second washers 118, 120, and a nut 122. Outer skin 104 and inner skin 106 have a common width which is sized according to the nominal inner diameter of the collar 100, which is the common outer diameter of the cylindrical duct sections being connected. The preferred skin widths are the same as those for collar 20. Clamping collar 100 is used for joining duct sections 3-inches or less in diameter, and is optional for duct sections greater than 3-inches diameter.

What is claimed is:

1. A fume exhaust duct joint comprising:
   a generally cylindrical fiberglass reinforced plastic slip collar having an outer surface with a centrally disposed, circumferential rib extending therefrom;
   first and second generally cylindrical fiberglass reinforced plastic duct sections, each duct section terminating in an end portion proximal to said slip collar, each end portion superimposed on said slip collar and in abutment with said rib;
   adhesive sealant interposed between said end portions and said slip collar outer surface;
   generally circumferential clamping means disposed about said end portions;
   mechanical linkage means disposed between said clamping means and said end portions so as to impede slippage between said clamping means and said end portions under tensile loading; and
   adhesive sealant interposed between said clamping means and said end portions.

2. The duct joint of claim 1, further comprising fire retardant material disposed between said clamping means and said end portions.

3. The duct joint of claim 2, wherein:
   said adhesive sealant comprises a settable admixture of curing agent and novolac epoxy resin;
   said clamping means comprises at least one arcuate clamp portion having a metal inner skin attached to a metal outer skin;
   said mechanical linkage means is a multiplicity of punched protrusions in each said inner skin, each protrusion having an apex in penetrating contact with one of said duct section end portions; and
   said fire retardant material is an opposed pair of circumferential intumescent caulk beads attached to each said inner skin.

4. A clamping collar for clamping two generally cylindrical fiberglass reinforced plastic duct section end portions superimposed on a generally cylindrical fiberglass reinforced plastic slip collar having a centrally disposed, circumferential rib, the clamping collar comprising:
   generally circumferential clamping means disposed about said end portions; and
   mechanical linkage means disposed between said clamping means and said end portions so as to impede slippage between said clamping means and said end portions under tensile loading.

5. The clamping collar of claim 4, further comprising fire retardant material disposed between said clamping means and said end portions.

6. The collar of claim 5, wherein:
   said clamping means comprises at least one arcuate clamp portion having a metal inner skin attached to a metal outer skin;
   said mechanical linkage means is a multiplicity of punched protrusions in said inner skin, each protrusion having a bifurcated apex whose bifurcations are in penetrating contact with one of said duct section end portions; and
   said fire retardant material is an opposed pair of circumferential intumescent caulk beads attached to said inner skin.

7. A clamping collar for clamping two generally cylindrical fiberglass reinforced plastic duct section end portions superimposed on a generally cylindrical fiberglass reinforced plastic slip collar having a centrally disposed, circumferential rib, the clamping collar comprising:
   first and second clamp portions, each clamp portion having a generally cylindrically arcuate metal outer skin with a predetermined thickness and a predetermined radius of curvature, each outer skin bounded-by opposed ends, each end extending radially in a flange having a plurality of generally collinear holes, each clamp portion further having a generally cylindrically arcuate metal inner skin with a predetermined thickness and a predetermined radius of curvature such that the outer and inner skins can be congruently juxtaposed, each inner skin rotationally offset from and attached to the juxtaposed outer skin so that an end portion of the inner skin extends beyond a radial flange to form a seal guide which slides under the opposed flange of the other clamp portion when the clamp portions are disposed circumferentially about the two duct section end portions, each inner skin having an inner surface, each inner skin inner surface having a multiplicity of punched protrusions, each protrusion having a bifurcated apex whose bifurcations are brought into penetrating contact with one of said duct section end portions as the two clamp portions are tightened about the end portions; and a plurality of bolts and nuts, each bolt passing through a pair of corresponding holes in each pair of opposed flanges and secured by an adjustably tightenable nut.

8. The clamping collar of claim 7, further comprising an opposed pair of circumferential intumescent caulk beads attached to said inner surface of each said inner skin.

9. The clamping collar of claim 8, wherein the outer and inner skins are fabricated from stainless steel, said juxtaposed inner and outer skins are spot-welded, said outer skin thickness is in a range from about 0.050-inch to about 0.141-inch, said inner skin thickness is in a range from about 0.012-inch to about 0.037-inch, and said plurality of collinear holes is three.

10. A clamping collar for clamping two generally cylindrical fiberglass reinforced plastic duct section end portions superimposed on a generally cylindrical fiberglass reinforced plastic slip collar having a centrally disposed, circumferential rib, the clamping collar comprising:

a clamp portion having a generally cylindrically arcuate metal outer skin with a predetermined thickness and a predetermined radius of curvature, the outer skin bounded by opposed ends, each end extending radially in a flange having a plurality of generally collinear holes, the clamp portion further having a generally cylindrically arcuate metal inner skin with a predetermined thickness and a predetermined radius of curvature such that the outer and inner skins can be congruently juxtaposed, the inner skin rotationally offset from and attached to the juxtaposed outer skin so that an end portion of the inner skin extends beyond a radial flange to form a seal guide which slides under the opposed flange when the clamp portion is disposed circumferentially about the two duct section end portions, the inner skin having an inner surface having a multiplicity of punched protrusions, each protrusion having a bifurcated apex whose bifurcations are brought into penetrating contact with one of said duct section end portions as the clamp portion is tightened about the end portions; and a plurality of bolts and nuts, each bolt passing through a pair of corresponding holes in each pair of opposed flanges and secured by an adjustably tightenable nut.

11. The clamping collar of claim 10, further comprising an opposed pair of circumferential intumescent caulk beads attached to said inner surface of said inner skin.

12. The clamping collar of claim 11, wherein the outer and inner skins are fabricated from stainless steel, said juxtaposed inner and outer skins are spot-welded, said outer skin thickness is in a range from about 0.050-inch to about 0.141-inch, said inner skin thickness is in a range from about 0.012-inch to about 0.037-inch, and said plurality of collinear holes is three.

13. A method for assembling a fume exhaust duct joint comprising a generally cylindrical fiberglass reinforced plastic slip collar having an outer surface with a centrally disposed, circumferential rib extending therefrom, and first (upstream) and second (downstream) generally cylindrical fiberglass reinforced plastic duct sections, each duct section terminating in an end portion proximal to said slip collar, each end portion having an inner surface and an outer surface, the method comprising the steps of:

coating the entire inner surface of each said end portion with a relatively thin layer of adhesive sealant;

coating the entire outer surface of said slip collar with a relatively thick layer of said sealant;

inserting said slip collar into said end portion of said upstream duct section until the end portion abuts said circumferential rib;

beveling smooth any sealant extruded into the interior of the slip collar;

inserting said slip collar into said end portion of said downstream duct section until the end portion abuts said circumferential rib;

spreading sealant extruded onto said end portion outer surfaces laterally and circumferentially around said surfaces;

surrounding said end portions with a bifurcated clamping collar comprising first and second clamp portions; and tightening said clamp portions about said end portions.

14. The method of claim 13, wherein:

each said clamp portion has a generally cylindrically arcuate metal outer skin with a predetermined thickness and a predetermined radius of curvature, and each outer skin is bounded by opposed ends with each end extending radially in a flange having a plurality of generally collinear holes;

each clamp portion further has a generally cylindrically arcuate metal inner skin with a predetermined thickness and a predetermined radius of curvature such that each pair of outer and inner skins can be congruently juxtaposed, with each inner skin rotationally offset from and attached to the juxtaposed outer skin so that an end portion of the inner skin extends beyond a radial flange to form a seal guide which slides under the opposed flange of the other clamp portion when the clamp portions are disposed circumferentially about said duct section end portions; and each inner skin has an inner surface having a multiplicity of punched protrusions, each protrusion having a bifurcated apex whose bifurcations are brought into penetrating contact with one of said duct section end portions as the two clamp portions are tightened about the end portions using a plurality of bolts and nuts, with each bolt passing through a pair of corresponding holes in each pair of opposed flanges and secured by an adjustably tightenable nut.

15. The method of claim 14, wherein a pair of opposed, circumferential intumescent caulk beads are attached to the inner surface of each said inner skin.

16. The method of claim 15, wherein said adhesive sealant comprises a settable admixture of curing agent and novolac epoxy resin.

* * * * *